United States Patent [19]

Hallberg et al.

[11] 4,111,219
[45] Sep. 5, 1978

[54] INDUSTRIAL FUEL BLENDER AND FUEL BLENDING METHOD

[75] Inventors: John Emil Hallberg, Peachtree City; Otis Max Taylor, East Point, both of Ga.

[73] Assignee: TMC, Inc., Atlanta, Ga.

[21] Appl. No.: 795,782

[22] Filed: May 11, 1977

[51] Int. Cl.² ............................................. F16K 19/00
[52] U.S. Cl. .......................................... 137/3; 48/103; 48/180 H; 137/604
[58] Field of Search ................ 48/103, 180 R, 180 C, 48/180 H, 197 FM; 137/3, 341, 334, 604; 431/11, 208, 217

[56] References Cited

U.S. PATENT DOCUMENTS

| | | | |
|---|---|---|---|
| 2,127,880 | 8/1938 | Medsker | 431/208 X |
| 3,257,180 | 6/1966 | King | 48/180 R |

*Primary Examiner*—Robert G. Nilson
*Attorney, Agent, or Firm*—Robert B. Kennedy

[57] ABSTRACT

An industrial fuel blender having a vaporizer chamber adapted to be partially filled with a liquid fuel additive, heater means for heating liquid fuel additive in the vaporizer chamber, and a fuel blender housing. A base fuel conduit passes through the fuel blender housing through which gaseous base may flow, and a fuel additive conduit communicates between the vaporizer chamber and the base fuel conduit within the fuel blending housing through which vaporized fuel additive may flow. Means are provided for thermally coupling the fuel blender housing with the vaporizer chamber to inhibit condensation of vaporized fuel additive as it flows through the fuel additive conduit and into the base fuel conduit within the fuel blender housing. Valve means are provided for concurrently controlling the flow of gaseous fuel and vaporized fuel additive in the conduits. A venturi is also provided at the junction of the two conduits for drawing the fuel additive into a flowing stream of the base fuel.

A method is also disclosed for blending a base fuel with a fuel additive which comprises the steps of providing a supply of base hydrocarbon fuel in a gaseous state under pressure within a supply container, providing a supply of hydrocarbon fuel additive in a liquid state in an additive container, heating the fuel additive to cause fuel additive to be vaporized in the additive container, and drawing it by venturi action into the base fuel flow stream.

12 Claims, 3 Drawing Figures

INDUSTRIAL FUEL BLENDER AND FUEL BLENDING METHOD

BACKGROUND OF THE INVENTION

This invention relates generally to industrial fuel blenders and fuel blending methods.

It has long been recognized that certain hydrocarbon additives dramatically improve the heating capacity and flame cutting efficiency of base hydrocarbon fuels such as natural gas and propane. However, in order to enrich base hydrocarbon fuels properly and efficiently the fuel additives must be consistently blended in a proper mix ratio and preferably with minimal waste residual.

Heretofore, as exemplified by co-pending U.S. Pat. Applications Ser. Nos. 679,353 abandoned and 707,519, which are assigned to the assignee of the present application, systems and methods have been developed for pre-blending base hydrocarbon fuels with fuel enriching hydrocarbon additives while both are in their liquid states. A difficulty encountered in doing this properly, however, is attributable to the fact that the additives ordinarily have a higher specific gravity than do the base fuels and thus tend to settle to the bottom of any container in which they are stored in a pre-blended condition.

To avoid the just described problem other blending systems have heretofore been developed as exemplified by that disclosed in U.S. Pat. No. 3,924,648. Here a base fuel is blended in its gaseous state with a fuel enriching additive in its liquid state by percolating the base fuel upwardly through a supply of the liquid additive. Blending efficiency, however, has remained relatively poor with these types of systems due to inconsistent vaporization of the hydrocarbons occasioned by ambient temperature variations. Variations in atmospheric conditions and specific gravity divergencies have also caused post-blending separation and fuel mixture ratio inconsistencies which in turn lead to inconsistencies in operation efficiency and effectiveness as, for example, where the enriched fuel is used for cutting torches. In addition, following apparent exhaustion of fuel additive from their containers, it has heretofore been a very common occurrence to observe, upon container disassembly and inspection, a small supply of residual additive remaining which leads to waste. Furthermore, supply cylinders have also needed frequency maintenance in order to clean a gummy residue left therein resulting from stratification.

Accordingly, it is a general object of the present invention to provide an improved industrial fuel blender and fuel blending method.

More specifically, it is an object of the present invention to provide an improved fuel blender and fuel blending method for blending a base hydrocarbon fuel in its gaseous state with a fuel enriching hydrocarbon additive in its gaseous state.

Another object of the invention is to provide an industrial fuel blender and fuel blending method of the type described with means for inhibiting condensation of gaseous fuel additive during blending operations.

Another object of the invention is to provide a fuel blender and fuel blending method of the type described having simplified means for controlling flow.

Another object of the invention is to provide a fuel blender and fuel blending method of the type described capable of substantially emptying a supply of fuel additive while maintaining the blending ratio of additive to base fuel substantially uniform until additive exhaustion has occurred.

Yet another object of the invention is to provide a fuel blender and fuel blending method of the type described the use of which affects consistent blending under varying ambient temperature and pressure conditions.

SUMMARY OF THE INVENTION

In one form of the invention an industrial fuel blender is provided which comprises a vaporizer chamber adapted to be partially filled with a liquid fuel additive, heater means for heating liquid fuel additive in the vaporizer chamber, and a fuel blender housing. A base fuel conduit passes through the fuel blender housing through which gaseous base fuel may flow. A fuel additive conduit communicates between the vaporizer chamber and the base fuel conduit within the fuel blender housing through which vaporized fuel additive may flow. Means for thermally coupling the fuel blender housing with the vaporizer chamber are also provided to inhibit condensation of vaporized fuel additive as it flows through the fuel additive conduit and into the base fuel conduit within the fuel blender housing.

In another form of the invention an industrial fuel blender is provided which comprises a vaporizer chamber adapted to be partially filled with a liquid fuel additive, a base fuel conduit mounted adjacent the vaporizer chamber through which gaseous base fuel may flow, and a fuel additive conduit communicating with the vaporizer chamber and junctioning with the base fuel conduit through which vaporized fuel additive may flow. The blender is also provided with valve means for concurrently controlling the flow of gaseous base fuel and vaporized fuel additive in the base fuel and fuel additive conduits.

In another form of the invention an industrial fuel blending system is provided which comprises a base fuel supply tank and a vaporizer chamber adapted to be partially filled with liquid fuel additive. The system is also provided with a surge tank and a venturi having an outlet in fluid communication with the surge tank. A fuel additive conduit communicates through valve control means between the vaporizer chamber and the venturi through which conduit vaporized fuel additive may flow. A base fuel conduit communicates through valve control means between the venturi and the base fuel supply tank through which gaseous base fuel may flow and be mixed in the venturi with vaporized fuel additive and the mixture conveyed to the surge tank.

In yet another form of the invention a method is provided for blending a base fuel with a fuel additive comprising the steps of providing a supply of hydrocarbon fuel in a gaseous state under pressure within a supply container, providing a supply of hydrocarbon fuel additive in a liquid state in an additive container, heating the fuel additive thereby causing fuel additive to be vaporized in the additive container and forming it into a flow stream, and releasing vaporized fuel additive from the additive container and drawing it by venturi action into the base fuel flow stream.

DESCRIPTION OF THE PREFERRED EMBODIMENTS

Figure 1:
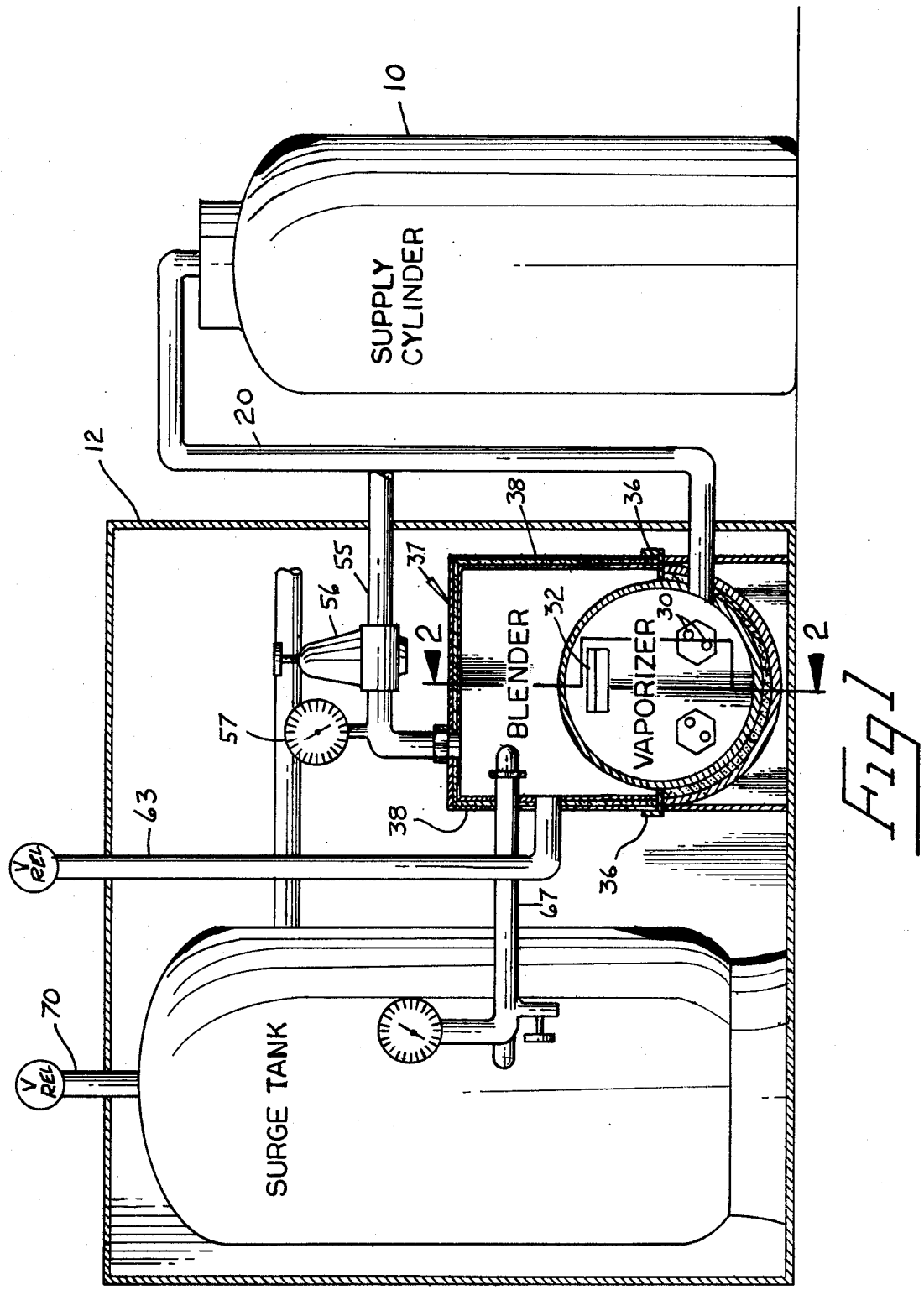
FIG. 1 is a side elevational view of a fuel blender embodying principles of the present invention which may be utilized in practicing a method of the present invention.

Referring now in more detail to the drawing there is shown an industrial fuel blender to which a supply cylinder 10 of fuel additive is connected. If desired, connection may be made through a conventional aerator. The blender is provided with a sheet metal cabinet 12 shown in section to reveal system components housed therein. These components include a vaporizer, a blender, a surge tank and associated conduits and valves.

Figure 2:
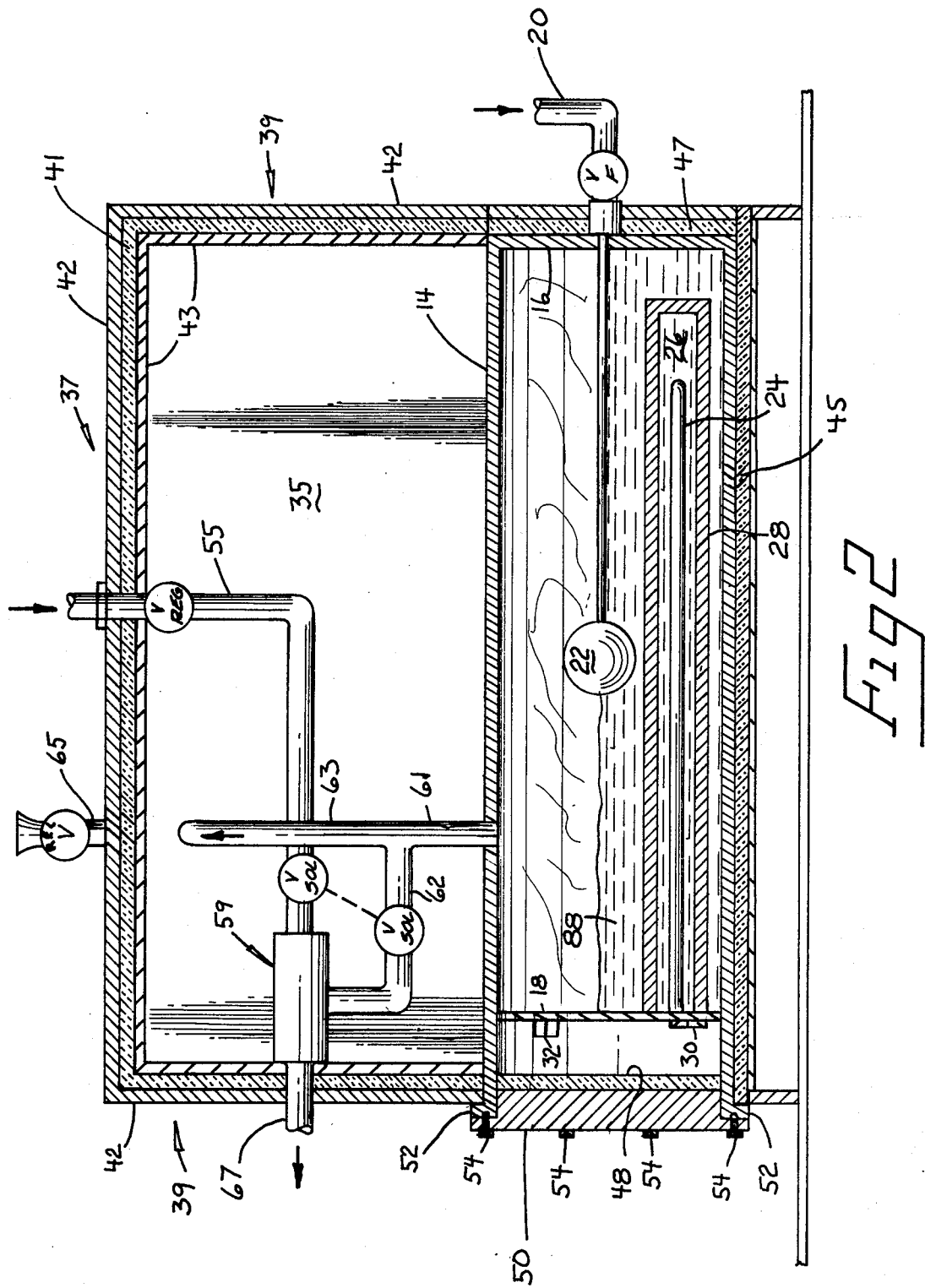
FIG. 2 is a side view, in cross-section, of the vaporizer and blender chambers shown in FIG. 1 taken along plane 2—2.

As may be seen by reference to FIG. 2, the vaporizer comprises an enclosed chamber formed by a hollow, metallic cylinder 14 having one end sealed by a disc-shaped wall 16 and its other end sealed by another disc-shaped wall 18. A conduit 20 connects the fuel additive supply cylinder 10 with the interior of the vaporizer chamber through a float valve VF controlled by a valve actuating float ball 22. A pair of heaters are mounted within the vaporizer chamber with each heater having an electrically energizable heater element 24 mounted within a supply of liquid anti-freeze 26 encapsulated within a metallic heater housing 28. Each heater has a pair of electric terminals 30 mounted on the outside of end wall 18. A thermostatic control 32 is also mounted to this end wall which is operatively connected by unshown electric connecting means to the two heaters.

With reference to both FIGS. 1 and 2 the blender is seen to include a blender chamber 35 formed by a lid adapted to be seated upon a pair of channel members 36 rigidly secured to each side of the vaporizer. The blender has a top 37 from which depend two side walls 38 and two end walls 39. Each of these blender walls and its top is seen to include a strip of thermal insulation 41 secured to the inside surface of a sheet metal member 42 overlaid with a foil backing 43. Beneath the blender housing additional thermal insulation 45 continues about the lower half of the vaporizer cylinder 14. A disc-shaped sheet of insulation 47 also overlays the end walls 16 of the vaporizer. Another disc-shaped sheet of insulation 48 is mounted behind a vaporizer cover plate 50 that is adapted to be secured to vaporizer flanges 52 by means of threaded bolts 54.

So constructed it is seen that both the vaporizer and blender chambers are substantially encapsulated within a jacket of thermal insulation. In addition, the presence of but one metallic structural member between the two chambers provides good thermal conduction between the two chambers. In this manner heat from the two vaporizer heaters may be readily conducted into the blender with minimal thermal loss to the ambient atmosphere.

With continued reference to the drawing a base fuel conduit 55 is seen to extend from an unshown supply of gaseous base fuel through a valve 56 and pressure meter 57 down through the top 37 of the blender and into the blender chamber through a valve regulator. This conduit then extends through a solenoid valve to a venturi 59 which is hereinafter described in more detail. A fuel additive conduit 61 extends out of the top of the vaporizer chamber into the blender housing where it bifurcates into conduits 62 and 63. Conduit 63 exits the blender housing and extends out of cabinet 12 to a flue 65 and an emergency relief valve. Conduit 62, on the other hand, communicates through another solenoid valve also to the venturi 59. Yet another conduit 67 extends from the venturi 59 out through an end wall of the blender housing and to a surge tank housed within cabinet 12. Another conduit 70 extends out the top of the surge tank, cabinet 12, and a valve regulator atop the cabinet to an unshown work piece such as a flame cutting torch.

Figure 3:
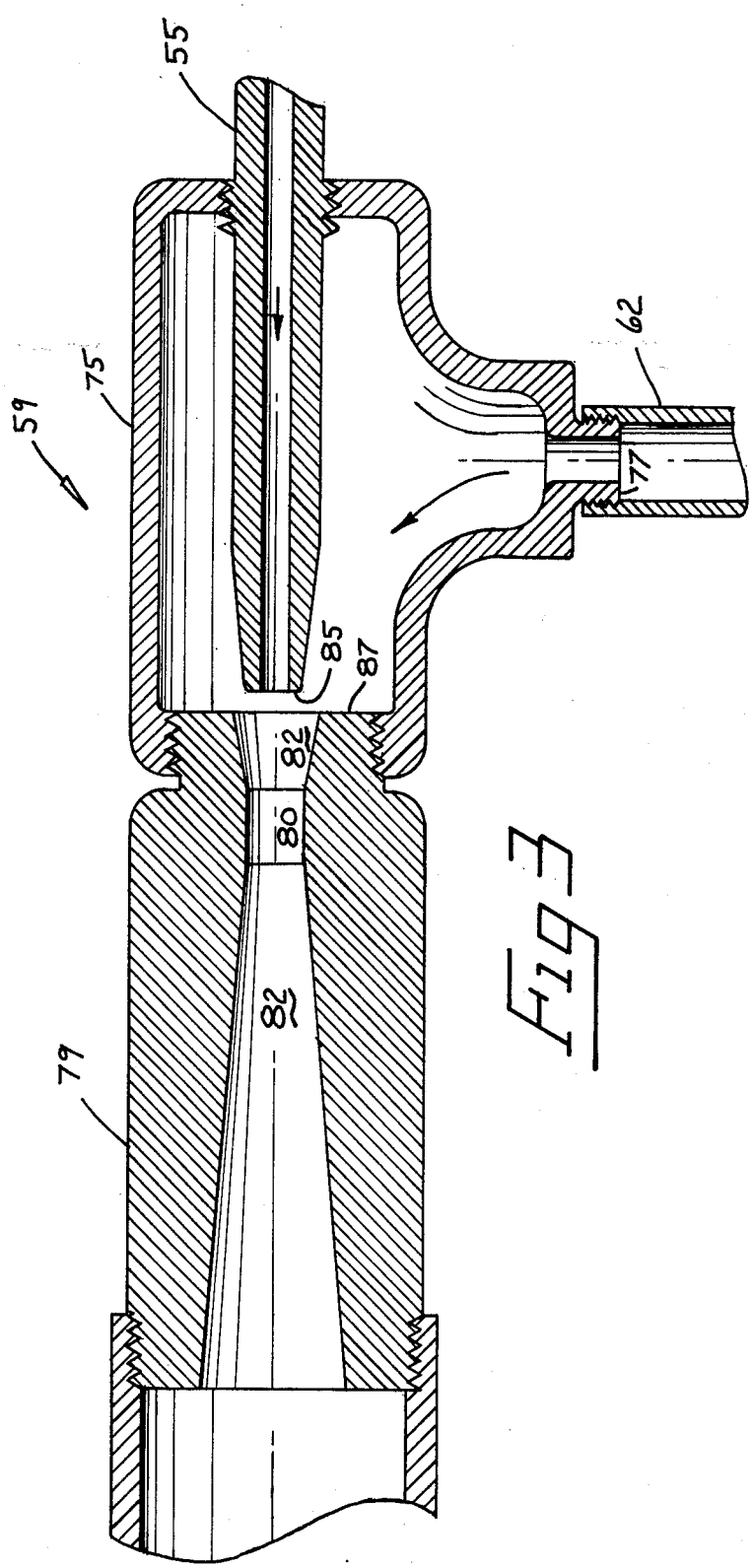
FIG. 3 is a side view, in cross-section, of the venturi component of the system mounted in the blender chamber shown in FIG. 2.

With reference next to FIG. 3 venturi 59 is seen to include a T-shaped coupling member 75 with a tapered end portion of conduit 55 threadedly received therein. The conduit 62 is also seen to be threadedly coupled to a lower neck 77 of the coupling. The venturi has an elongated coupling member 79 threadedly secured to the end of the T-shaped coupling 75 opposite the entrance thereinto of conduit 55. The elongated coupling member has an internal bore with a section 80 of uniform diameter from each end of which sections 82 communicate tapering toward enlarged bore ends distal section 80. As conduit 55 is threadedly received within the T-shaped coupling its tapered end 85 may be adjusted to change the size of the lateral opening thereabout between it and the end 87 of the elongated coupler mounted adjacent thereto.

In operation a supply cylinder of liquid hydrocarbon fuel additive 10 is connected to conduit 20 as shown in FIG. 1, and a supply of pressurized gaseous base hydrocarbon fuel such as natural gas or propane connected to the unshown end of conduit 55 and valve 56 manually opened. With no liquid fuel additive having been within the vaporizer chamber float ball 22 opens the float valve enabling liquid fuel additive to pass through conduit 20 and into the vaporizer chamber. The float valve is adjusted to close when the chamber is a little more than half filled as seen in FIG. 2. Thermostat 32 thereupon calls for energization of the two heating elements 24. Their operation accelerates vaporization of the fuel additive in the chamber into the space above the surface thereof. When a supply of enriched fuel is demanded, the solenoid valves are energized in common. An opening of these valves enables the pressurized gaseous base fuel to be drawn through conduit 55 into the venturi 59 and form a flow stream therethrough. Vaporized fuel additive will thereupon be drawn by venturi action through conduit 62, into the venturi and into the flow stream between the end 85 of conduit 55 and the end 87 of the elongated coupler. The resulting gaseous mixture of base and additive fuels is then conducted through conduit 67 into the surge tank. From here upon operation of a relief valve atop the surge tank the enriched fuel is drawn to an operating workpiece or tool.

From the foregoing it will be apparent that the just described blender is thermally coupled with the vaporizer and its heaters. In this manner the flow of vaporizer fuel additive through conduit 61 and 62 will not ordinarily cause appreciable condensation of the additive prior to its blending within the venturi due to the elevation of temperature within the blender. Furthermore, little heat is lost to ambient due to the pressure of insulation about both the blender and vaporizer as a unit. The fact that both of the solenoid valves controlling the flow of fluids between conduits 55 and 62 are commonly coupled provides effective control and consistency in blend mixture. The venturi itself utilizes the force of the pressurized base fuel to draw vaporized additive in a positive manner with a resulting consistent mix ratio. That the venturi itself is an adjustable feature enables one readily to adjust the end 85 of conduit 55 and thereby adjust the mixture ratio.

It should be understood that the just described embodiment merely illustrate principles of the invention in one selected form. Many modifications, additions and deletions may, of course, be made thereto without departure from the spirit and scope of the invention as set forth in the following claims.

We claim:

1. An industrial fuel blender comprising, in combination, a vaporizer chamber adapted to be partially filled with a liquid fuel additive; heater means for heating liquid fuel additive in said vaporizer chamber; a fuel blender housing; a base fuel conduit passing through said fuel blender housing through which gaseous base fuel may flow; a fuel additive conduit communicating between said vaporizer chamber and said base fuel conduit within said fuel blender housing through which vaporized fuel additive may flow; and means for thermally coupling said fuel blender housing with said vaporizer chamber to inhibit condensation of vaporized fuel additive as it flows through the fuel additive conduit and into the base fuel conduit within the fuel blender housing.

2. An industrial fuel blender in accordance with claim 1 wherein said fuel blender housing is mounted atop said vaporizer chamber.

3. An industrial fuel blender in accordance with claim 1 wherein said fuel blender housing and vaporizer chamber share a common thermally conductive metallic wall.

4. An industrial fuel blender in accordance with claim 1 further comprising thermal insulation about a combination of said vaporizer chamber and said fuel blender housing.

5. An industrial fuel blender in accordance with claim 1 further comprising first valve means within said fuel blender housing for controlling the flow of base fuel through said base fuel conduit, and second valve means within said fuel blender housing for controlling the flow of vaporized fuel additive through said fuel additive conduit.

6. An industrial fuel blender in accordance with claim 5 wherein said first and second valve means are operatively coupled together for simultaneous operation in response to a single operational command.

7. An industrial fuel blender in accordance with claim 1 wherein said fuel additive conduit junctions with said base fuel conduit at a venturi mounted within said fuel blender housing.

8. An industrial fuel blender in accordance with claim 7 further comprising valve means mounted within said fuel blender housing for simultaneously controlling the flow of base fuel within said base fuel conduit and the flow of vaporized fuel additive within said fuel additive conduit upstream from said venturi.

9. An industrial fuel blender in accordance with claim 7 further comprising venturi control means for altering the mixture ratio of gaseous base fuel and vaporized fuel additive at the venturi junction of said base fuel conduit and fuel additive conduit within said fuel blender housing.

10. An industrial fuel blender comprising, in combination, a vaporizer chamber adapted to be partially filled with a liquid fuel additive; heater means for heating and vaporizing liquid fuel additive in said vaporizer chamber; a base fuel conduit mounted adjacent said vaporizer chamber through which gaseous base fuel may flow; a fuel additive conduit communicating with said vaporizer chamber and junctioning with said base fuel conduit through which vaporized fuel additive may flow; valve means for concurrently controlling the flow of gaseous base fuel and vaporized fuel additive in said conduits; and a thermally insulative cover about said vaporizer chamber, said base fuel conduit and said fuel additive conduit.

11. An industrial fuel blending system comprising, in combination a base fuel supply tank; a vaporizer chamber adapted to be partially filled with a liquid fuel additive; heater means for heating and thereby vaporizing liquid fuel additive in said vaporizer chamber; a surge tank; a venturi having an outlet in fluid communication with said surge tank; a blender housing thermally coupled with said vaporizer chamber in which said venturi is mounted; a fuel additive conduit communicating through valve control means between said vaporizer chamber and said venturi through which additive may flow; and a base fuel conduit communicating through valve control means between said venturi and said base fuel supply tank through which gaseous base fuel may flow and be mixed in said venturi with vaporized fuel additive which mixture may then be conveyed to said surge tank.

12. A method of blending a base fuel with a fuel additive comprising the steps of:
   a. providing a supply of base hydrocarbon fuel in a gaseous state under pressure within a supply container;
   b. providing a supply of hydrocarbon fuel additive in a liquid state in an additive container;
   c. heating the fuel additive thereby causing fuel additive to be vaporized in the additive container;
   d. releasing pressurized base fuel from the supply container and forming it into a flow stream; and
   e. releasing vaporized fuel additive from the additive container and drawing it by venturi action into the base fuel flow stream by drawing fuel additive into the base fuel flow stream at a venturi junction being heated by heat conducted from the additive container thereby inhibiting condensation of fuel additive as it is drawn from the additive container and into the base fuel flow stream.

* * * * *